United States Patent
Laycock et al.

(10) Patent No.: US 7,757,027 B2
(45) Date of Patent: Jul. 13, 2010

(54) CONTROL OF MASTER/SLAVE COMMUNICATION WITHIN AN INTEGRATED CIRCUIT

(75) Inventors: Christopher William Laycock, Sheffield (GB); Antony John Harris, Hope Valley (GB); Bruce James Mathewson, Papworth Everard (GB); Richard Roy Grisenthwaite, Nr Royston (GB); Stuart David Biles, Little Thurlow (GB)

(73) Assignee: ARM Limited, Cambridge (GB)

( * ) Notice: Subject to any disclaimer, the term of this patent is extended or adjusted under 35 U.S.C. 154(b) by 44 days.

(21) Appl. No.: 12/213,470

(22) Filed: Jun. 19, 2008

(65) Prior Publication Data

US 2009/0319707 A1    Dec. 24, 2009

(51) Int. Cl.
*G06F 13/00* (2006.01)
(52) U.S. Cl. .................. 710/110; 710/105; 711/141; 711/146
(58) Field of Classification Search .............. 710/105, 710/110; 711/141, 146
See application file for complete search history.

(56) References Cited

U.S. PATENT DOCUMENTS

| | | | | |
|---|---|---|---|---|
| 6,081,860 | A * | 6/2000 | Bridges et al. | 710/110 |
| 6,622,216 | B1 * | 9/2003 | Lin | 711/141 |
| 7,275,125 | B2 * | 9/2007 | Drehmel et al. | 710/315 |
| 2008/0086578 | A1 * | 4/2008 | Yoshida et al. | 710/48 |
| 2008/0136445 | A1 * | 6/2008 | Kishinevsky et al. | 326/37 |
| 2009/0276580 | A1 * | 11/2009 | Moyer | 711/146 |

OTHER PUBLICATIONS

The I2C-Bus Specification, Version 2.1; Philips Semiconductors; Jan. 2000.*
Bainbridge et al., "Chain: A Delay-Insensitive Chip Area Interconnect", IEEE, pp. 16-23, (200).

* cited by examiner

*Primary Examiner*—Glenn A Auve
(74) *Attorney, Agent, or Firm*—Nixon & Vanderhye P.C.

(57) ABSTRACT

An integrated circuit 2 includes a transaction master 4 connected via interconnect circuitry 10 to a transaction slave 12. The transaction slave 12 generates a transfer-complete signal (R Last or B) to indicate completion of a data transfer (either a read or a write). When this transfer-complete signal has been received by the transaction master 4, then the transaction master 4 generates a complete-acknowledgement signal RACK, WACK, which is passed back to the transaction slave so as to acknowledge receipt of the transfer-complete signal.

26 Claims, 12 Drawing Sheets

RACK = RVALID & RREADY & RLAST
WACK = BVALID & BREADY

CONTROL OF MASTER/SLAVE COMMUNICATION WITHIN AN INTEGRATED CIRCUIT

BACKGROUND OF THE INVENTION

1. Field of the Invention

This invention relates to the field of integrated circuits. More particularly, this invention relates to integrated circuits having a transaction master and a transaction slave between which data transfer operations are performed including the transfer of control signals.

2. Description of the Prior Art

It is known to provide integrated circuits Including one or more transaction masters and one or more transaction slaves. These transaction masters and transaction slaves communicate so as to exchange data via buses and/or interconnects operating in accordance with a communication protocol. An example of such systems are those built in accordance with the AMBA specification developed by ARM Limited of Cambridge, England. In such integrated circuits, a transaction master generates a transaction request which is sent to a transaction slave in respect of a data transfer operation to be performed between the transaction master and the transaction slave. The transaction slave generates a transaction response and included within this transaction response is a transfer-complete signal indicating completion of the data transfer operation. As an example, if the transaction to be performed is a write of data from the transaction master to the transaction slave, then the transaction response sent by the transaction slave back to the transaction master includes a write acknowledgement signal indicating that the write transfer has been (or will be) completed by the transaction slave. If the data transfer is a read of data from the transaction slave to the transaction master, then the transfer response from the transaction slave to the transaction master includes a last word signal indicative of a last data word of the one or more data words being read from the transaction slave to the transaction master. The transaction master will accordingly be informed that the transaction is complete.

SUMMARY OF THE INVENTION

Viewed from one aspect the present invention provides an integrated circuit comprising:
 a transaction master; and
 a transaction slave coupled to said transaction master so as to receive a transaction request generated by said transaction master for a data transfer operation to be performed and to supply a transaction response to said transaction master; wherein
  said transaction master is responsive to a transfer-complete signal within said transaction response indicating completion of said data transfer operation to supply a complete-acknowledgement signal to said transaction slave so as to acknowledge receipt of said transfer-complete signal.

The present technique recognises that in a variety of situations it is useful for the transaction slave to be notified by a complete-acknowledgement signal (which may, for example, be a single wire signal, a handshaked wire signal, or a handshaked (multibit) payload signal) that the transaction master has received the transfer-complete signal (which may, for example, be a single wire signal, a handshaked wire signal, or a handshaked (multibit) payload signal), i.e. that the transaction master is in a state corresponding to its previous transaction request having been completed.

It will be appreciated that the transfer operation could be a read transaction or a write transaction. In the case of read transactions coherency status can be specified by data within the transaction response so as to indicate coherency parameters associated with the read transfer, such as "unique", "shared", etc. The transfer-complete signal in respect of a read transfer may be a last word signal indicating a last data word of one or more data words to be transferred. This complete-acknowledgement signal can be sent in respect of all read transactions or may only be sent in respect of read transactions having associated coherency requirement. In the case of write transfers, the transfer-complete signal may be a write acknowledge signal. The complete-acknowledgement signal can be sent for all write transactions, or for only those write transactions having an associated coherency requirement.

Whilst it would be appreciated that the transaction master and the transaction slave can be connected in a variety of different ways (e.g. simple point-to-point buses that are permanently connected), it is advantageously flexible and efficient to use interconnect circuitry within the integrated circuit so as to connect a plurality of transaction masters with the interconnect circuitry providing respective transaction slaves to which those transaction masters are connected. The interconnect circuitry also includes transaction masters which serve to relay transactions to other connected devices, such as transaction slaves outside of the interconnect circuitry. Thus, communication via the interconnect circuitry is performed as a series of point-to-point master-to-slave transfers.

The complete-acknowledgement signal is useful in systems where at least one of the transaction masters includes a local cache memory and the interconnect circuitry includes coherency control circuitry generating a snoop transaction used to identify any coherency conflicts between data within the local cache memory and a candidate transaction request received from another transaction master. The interconnect circuitry is an appropriate place to provide coherency control circuitry for generating snoop transactions and providing serialisation control (e.g. a point of serialization) of respective transaction requests received from a variety of sources.

The present technique recognises that as a consequence of the variable delays that can be associated with transactions being performed upon a typically complex modern integrated circuit, it is important that snoop transactions (formed of a snoop request, a snoop response and optionally snoop data) are correctly serialised with respect to data transfer transactions. If a snoop request overtakes a pending data transfer transaction, then an inappropriate snoop response may be returned and a coherency conflict may arise (in this context a pending transaction signifies one for which a transaction response has been issued from the slave to the master but has not yet reached the master). Some example embodiments of the present technique address this problem by providing that the coherency control circuitry defers sending a snoop transaction to a transaction master in respect of a candidate transaction request accessing at least one memory address which is also accessed by a pending transaction request that has been generated by that transaction master. The snoop request is deferred until after the complete-acknowledgement signal for that pending transaction has been received by the coherency control circuitry. Thus, appropriate serialization between the pending transaction and the later snoop transaction is ensured by waiting until the complete-acknowledgement signal has been received from the transaction master to indicate that it has properly adopted a state corresponding to the completion of that previous transaction.

While the above example provides coherency control circuitry which deferred snoop transactions when there was a memory address overlap, it is also possible to provide simpler embodiments in which snoop transactions are deferred if the transaction master concerned has any pending transaction request which has not yet resulted in a complete-acknowledgement signal being sent to the coherency control circuitry. This will be safe and simpler to implement, but less efficient.

As well as generating snoop transactions and deferring candidate transaction requests, the coherency control circuitry can provide serialization of transaction requests received from different transaction masters so as to maintain appropriate control of the coherent state of the system.

Within integrated circuits it is known to provide different portions operating at different rates, e.g. different domains within a single integrated circuit may have different clock frequencies. In this context, it is possible that a transaction master may be configured to transmit complete-acknowledgement signals at a faster rate than the transaction slave can receive these complete-acknowledgement signals. One way of addressing this problem would be exerting "back-pressure" on the complete-acknowledgement signal, e.g. preventing a complete-acknowledgement signal being issued by a master until the preceding complete-acknowledgement signal has propagated sufficiently. In order to address this problem, a counter circuit can be provided between the transaction master and the transaction slave so as to count complete-acknowledgement signals generated by the transaction master and to assert a complete-acknowledgement signal to the transaction slave so as to permit a corresponding number of complete-acknowledgement signals to be received by the transaction slave at its slower rate of operation.

The present technique can be used within a highly symmetrical system, such as a system including multiple symmetric processor cores each with an associated local cache memory, e.g. an SMP (symmetric multiprocessing) system. However, the present technique provides a mechanism for assisting with the coherency control within more complex systems including a plurality of different types of transaction masters with associated local cache memory forming part of a heterogeneous coherent memory. Such heterogeneous systems are more likely to be prone to unpredictable path delays associated with transactions and accordingly the provision of the complete-acknowledgement signal is useful in confirming the state of the transaction master.

The problems associated with variable delays are prevalent in systems including one or more register stages disposed in at least some signal paths within the integrated circuit. These register stages may be inserted for other reasons (e.g. permitting higher clock rates to be supported and asymmetric wire delays may require asymmetric registering of the channels), but introduce problems of variable delays that can be addressed by the provision of the complete-acknowledgement signal of the present technique.

The complete-acknowledgement signal can have a variety of different forms. An the case of a read request, it may be a single read acknowledgement signal on a single signal line and in a similar way, in the case of a write request, the complete-acknowledgement signal may be a single write acknowledgement signal on a single signal line.

Overall system design may be simplified when transaction masters which are not prone to the coherency problems discussed above are arranged to continuously assert their complete-acknowledgement signal and respective transaction slaves start to sample the complete-acknowledgement signal when they have sent the transfer-complete signal. This can reduce delay and enable the transaction slave to behave in the same way independently of whether the transaction master with which communication is taking place is one that selectively generates the complete-acknowledgement signal or permanently generates this signal. An alternative approach is to have a handshaked complete-acknowledgement signal this allows the slave to exert some back-pressure if desired.

Viewed from another aspect the present invention provides an integrated circuit comprising:

interconnect circuitry including a plurality of transaction slaves; and a plurality of transaction masters including at least one transaction master having a local cache memory and coupled to said interconnect circuitry via a transaction slave; wherein said transaction slave is coupled to said at least one transaction master so as to receive a transaction request generated by said transaction master for a data transfer operation to be performed and to supply a transaction response to said transaction master;

said at least one transaction master is responsive to a transfer-complete signal within said transaction response indicating completion of said data transfer operation to supply an complete-acknowledgement signal to said transaction slave so as to acknowledge receipt of said transfer-complete signal;

said interconnect circuitry includes coherency control circuitry generating a snoop transaction sent to said at least one transaction master to identify any potential coherency conflict between data within said local cache memory and a candidate transaction request received from another transaction master; and said coherency control circuitry defers sending said snoop transaction to said at least one transaction master in respect of a candidate transaction request accessing at least one memory address also accessed by a pending transaction requests that has been generated by said at least one transaction master until after said complete-acknowledgement signal of said pending transaction request has been received by said coherency control circuitry.

Viewed from a further aspect the present invention provides an integrated circuit comprising:

interconnect circuitry including a plurality of transaction slaves; and a plurality of transaction masters including at least one transaction master having a local cache memory and coupled to said interconnect circuitry via a transaction slave; wherein said transaction slave is coupled to said at least one transaction master so as to receive a transaction request generated by said transaction master for a data transfer operation to be performed and to supply a transaction response to said transaction master;

said at least one transaction master is responsive to a transfer-complete signal within said transaction response indicating completion of said data transfer operation to supply an complete-acknowledgement signal to said transaction slave so as to acknowledge receipt of said transfer-complete signal;

said interconnect circuitry includes coherency control circuitry generating a snoop transaction sent to said at least one transaction master to identify any potential coherency conflict between data within said local cache memory and a candidate transaction request received from another transaction master; and said coherency control circuitry defers sending said snoop transaction in respect of a candidate transaction of a first transaction master to a second transaction master having a pending transaction request until after said complete-acknowledgement signal of said pending transaction request has been received from said second transaction master by said coherency control circuitry.

Viewed from a further aspect the present invention provides an integrated circuit comprising:

transaction master means; and transaction slave means coupled to said transaction master means for receiving a transaction request generated by said transaction master means for a data transfer operation to be performed and for supplying a transaction response to said transaction master means; wherein said transaction master means is responsive to a transfer-complete signal within said transaction response indicating completion of said data transfer operation to supply an complete-acknowledgement signal to said transaction slave means so as to acknowledge receipt of said transfer-complete signal.

Viewed from a further aspect the present invention provides, a method of operating an integrated circuit comprising the steps of:

generating with a transaction master a transaction request for a data transfer operation to be performed;

receiving with a transaction slave said transaction request; and supplying a transaction response to said transaction master; wherein said transaction master is responsive to a transfer-complete signal within said transaction response indicating completion of said data transfer operation to supply an complete-acknowledgement signal to said transaction slave so as to acknowledge receipt of said transfer-complete signal.

Viewed from a further aspect the present invention provides a method of operating an integrated circuit having interconnect circuitry including a plurality of transaction slaves and a plurality of transaction masters including at least one transaction master having a local cache memory and coupled to said interconnect circuitry via a respective transaction slave, said method comprising the steps of:

generating with a transaction master a transaction request for a data transfer operation to be performed;

receiving with a transaction slave said transaction request; and supplying a transaction response to said transaction master; wherein said transaction slave is coupled to said at least one transaction master so as to receive a transaction request generated by said transaction master for a data transfer operation to be performed and to supply a transaction response to said transaction master;

said at least one transaction master is responsive to a transfer-complete signal within said transaction response indicating completion of said data transfer operation to supply an complete-acknowledgement signal to said transaction slave so as to acknowledge receipt of said transfer-complete signal;

said interconnect circuitry includes coherency control circuitry generating a snoop transaction sent to said at least one transaction master to identify any potential coherency conflict between data within said local cache memory and a candidate transaction request received from another transaction master; and said coherency control circuitry defers sending said snoop transaction in respect of a candidate transaction of a first transaction master to a second transaction master having a pending transaction request until after said complete-acknowledgement signal of said pending transaction request has been received from said second transaction master by said coherency control circuitry.

Viewed from a further aspect the present invention provides a method of operating an integrated circuit having interconnect circuitry including a plurality of transaction slaves and a plurality of transaction masters including at least one transaction master having a local cache memory and coupled to said interconnect circuitry via a respective transaction slave, said method comprising the steps of:

generating with a transaction master a transaction request for a data transfer operation to be performed;

receiving with a transaction slave said transaction request; and supplying a transaction response to said transaction master; wherein said transaction slave is coupled to said at least one transaction master so as to receive a transaction request generated by said transaction master for a data transfer operation to be performed and to supply a transaction response to said transaction master;

said at least one transaction master is responsive to a transfer-complete signal within said transaction response indicating completion of said data transfer operation to supply an complete-acknowledgement signal to said transaction slave so as to acknowledge receipt of said transfer-complete signal;

said interconnect circuitry includes coherency control circuitry generating a snoop transaction sent to said at least one transaction master to identify any potential coherency conflict between data within said local cache memory and a candidate transaction request received from another transaction master; and said coherency control circuitry defers sending said snoop transaction in respect of a candidate transaction of a first transaction master to a second transaction master having a pending transaction request until after said complete-acknowledgement signal of said pending transaction request has been received from said second transaction master by said coherency control circuitry.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
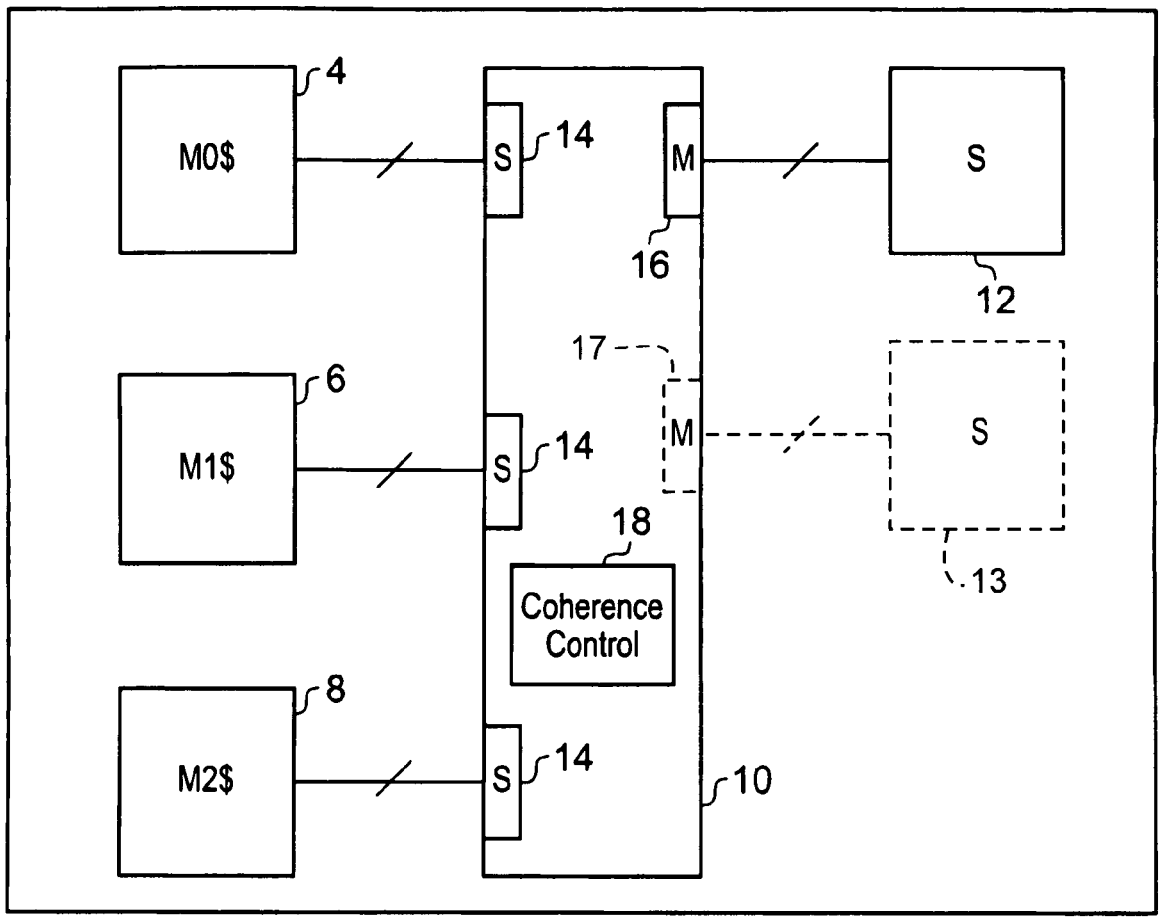
FIG. 1 illustrates an integrated circuit including multiple transaction masters connected via interconnect circuitry to a transaction slave.

FIG. 1 illustrates an integrated circuit 2 including a plurality of transaction masters 4, 6, 8 connected via interconnect circuitry 10 to a transaction slave 12 such as a memory, e.g. RAM). It will be appreciated that in other embodiments multiple transaction slaves 12 could be provided (such as optional transaction slave 13 and transaction master 17 shown in hidden lines). The interconnect circuitry 10 incorporates multiple transaction slaves 14 which connect to respective transaction masters 4, 6, 8 and provide point-to-point communication between the transaction master 4, 6, 8 and the interconnect circuitry 10. A transaction master 16 within the interconnect circuitry 10 provides point-to-point communication with the transaction slave 12. The interconnect circuitry 10 is responsible for the routing of transactions between the transaction slaves 14 and the transaction master 16.

Within the interconnect circuitry 10 there is provided coherence control circuitry 18 which is responsible for controlling to snoop transactions for the purposes of coherency control. As an example, if a transaction master 4 wishes to write some data to the transaction slave 12, then the coherency control circuitry 18 manages a snoop transaction to the transaction masters 6, 8 to determine whether or not the local cache memories in those transaction masters 6, 8 contain a copy of the data which is to be written by the transaction master 4. If a local copy exists within the transaction masters 6, 8, then this may be updated or invalidated as appropriate.

Caches in the system will support one or more of the MOESI (modified, owned, exclusive, shared and invalid) states. If a master wants to fetch or modify a cache line which could exist in the cache then:

a) The master will issue a transaction to the interconnect
b) The interconnect will issue a snoop transaction to any master which could have a copy of the line
c) If required, the interconnect will issue a read or write transaction to memory
d) The interconnect collates the responses from the snoops and, if required, memory and sends the response to the master Transactions may require that all snooped caches modify their cache line state—eg the issuing master is requesting uniqueness for a particular address. To ensure that cache lines do not enter illegal states (eg unique in multiple caches) there must be a global order of transactions.

In this system the interconnect is responsible for determining a global order of transactions to each address. A cached master assumes:

1. If its transaction completed after a snoop address is received then the snoop happened first
2. If its transaction completed before the snoop address was received the snoop happened last.

At an overall level, a data transfer operation to be performed between a transaction master 4 and a transaction slave 12 may be broken down into a series of point-to-point transactions first between the transaction master 4 and the transaction slave 14 within the interconnect circuitry 10 and then between the transaction master 16 within in the interconnect circuitry 10 and the transaction slave 12. The interconnect circuitry 10 provides appropriate switching to connect its transaction slave ports 14 and its transaction master ports 16.

Figure 2:
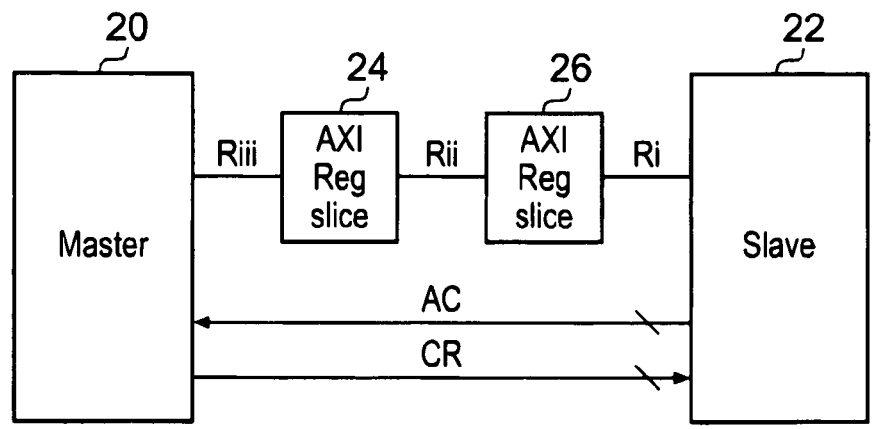
FIG. 2 schematically illustrates the communication between a transaction master and a transaction slave including a data transfer channel, a snoop request channel and a snoop response channel.

FIG. 2 illustrates a transaction master 20 in communication with a transaction slave 22. The transaction slave 22 may be part of interconnect circuitry 10 such as illustrated in FIG. 1 or could be a transaction slave 12 as illustrated in FIG. 1 with no interconnect circuitry 10 being provided between the transaction master 20 and the transaction slave 22. In the example illustrated, a data read channel R is provided via which read transactions may be performed. Additional channels (write, control, etc) may also be provided. This data read channel R has two register stages 24, 26 interposed within it such that it takes at least three clock cycles for a data value to pass between the transaction slave 22 and the transaction master 20 (back-pressure may be exerted). Such register stages 24, 26 can be provided for a variety of different reasons, such as to facilitate operation at higher clock frequencies.

Also illustrated in FIG. 2 is a snoop transaction channel composed of a channel which sends snoop requests AC from the transaction slave 22 to the transaction master 20 and passes snoop responses CR from the transaction master 20 back to the transaction slave 22. A snoop request can specify a memory address, or range of memory addresses, for which it is desired to determine whether or not the transaction master 20 holds a local copy thereof and whether any conflicting coherency parameters are associated with the local copy held by the transaction master 20 (e.g. the local copy is a unique copy, is dirty, etc).

Figure 3:
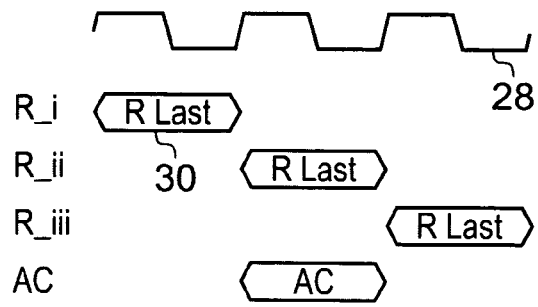
FIG. 3 is a signal timing diagram illustrating a potential problem which can arise during a read transaction with the system of FIG. 2.

FIG. 3 is a signal diagram illustrating a coherence breakdown problem which can arise with the arrangement of FIG. 2. Signal 28 is a clock signal controlling operation of the communication channels. The register stages 24, 26 in the data channel have the result that a signal R Last 30 (a transfer-complete signal—the R Last signal need not be provided in alternative embodiments that instead counts transfer beats, e.g. a signal can define the transfer length and then beats can be counted to identify the last transfer) being passed from the transaction slave to the transaction master 20 in response to a read transaction initiated by the transaction master 20 and indicating the last word of data is being transferred will take three clock cycles to pass from the transaction slave 22 to the transaction master 20. When this R Last signal 30 is received in the transaction master 20, then the transaction master 20 has a state corresponding to completion of the read transaction it previously initiated. At this point, the transaction master 20 will respond to the snoop requests taking account of the read transaction which has completed. Prior to receipt of the R Last signal 30, the transaction master 20 will not respond in a way consistent with the read transaction having completed. Accordingly, from the point of view of the transaction slave 22, which includes coherence control circuitry 18, the read transaction has completed once it has been issued into the register stage 26 and accordingly a snoop request AC subsequently sent to the transaction master 20 should result in a response corresponding to the read transaction having been completed in the transaction master 20. However, as the read data channel includes two register stages 24, 26 and takes three clock cycles to traverse, whereas the snoop channels do not contain any register stages and is traversed in only one clock cycle, as can be seen in FIG. 3, the snoop request AC can move ahead of the transfer-complete signal and accordingly the transaction master 20 will respond on the basis of the read transaction not yet being completed. This will be an incorrect coherence response from the point of view of the transaction slave 22. This can result in a breakdown in correct behaviour. The snoop request AC channel and the snoop response CR channel can be separate and independent, e.g. different routings and different numbers of slices.

Figure 4:
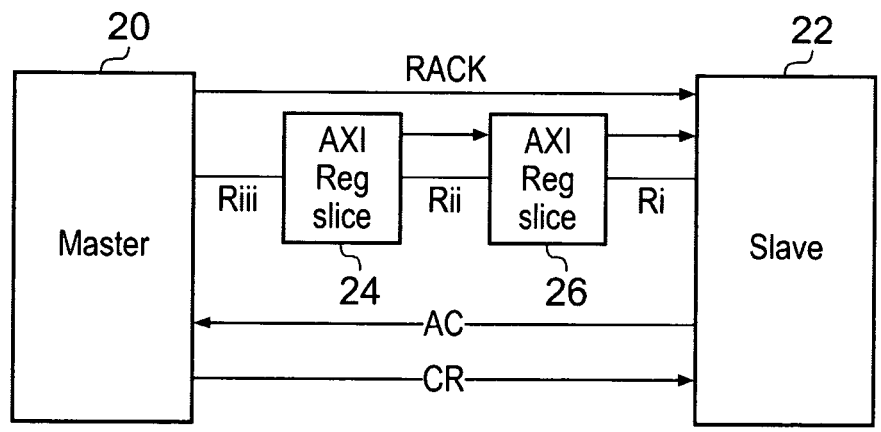
FIG. 4 is a modified version of FIG. 3 in which a complete-acknowledgement signal has been added to the data transaction channel between the transaction master and the transaction slave.

FIG. 4 illustrates a modification of the arrangement of FIG. 2. The system has been modified by the addition of a complete-acknowledgement signal RACK (read acknowledge) which is passed from the transaction master 20 back to the transaction slave 22 (via register stages if appropriate) when the transfer-complete signal (R Last) has been received by the transaction master 20. The transaction master 20 can be modified to provide the complete-acknowledgement signal RACK by adding some additional logic outside a known transaction master 20. In this case the additional logic should be considered to be part of the transaction master 20 and such embodiments are encompassed by the present techniques. The RACK signal (complete-acknowledgement) may be sent for all transactions or may alternatively only be sent for transactions with an associated coherency requirement. The coherence control circuitry 18 within the transaction slave 22 can observe the complete-acknowledgement signal from the transaction master 20 and defer sending the snoop request AC to the transaction master 20 until the complete-acknowledgement signal RACK for the read transaction has been received at the transaction slave 22. The coherence control circuitry within the transaction slave 22 (which may be part of the interconnect circuitry 10) can defer sending snoop requests AC to the transaction master 20 in respect of candidate transactions to be performed where these candidate transactions have overlapping memory addresses with the pending read transaction (or a pending write transaction) being performed by the transaction master 20. As an alternative, the coherence control circuitry may perform a simpler check (e.g. checking most significant address bits) or operate in a still more simple fashion by deferring all snoop requests AC being sent to the transaction master 20 when any transaction (read or write to any address) is pending for the transaction master 20.

Figure 5:
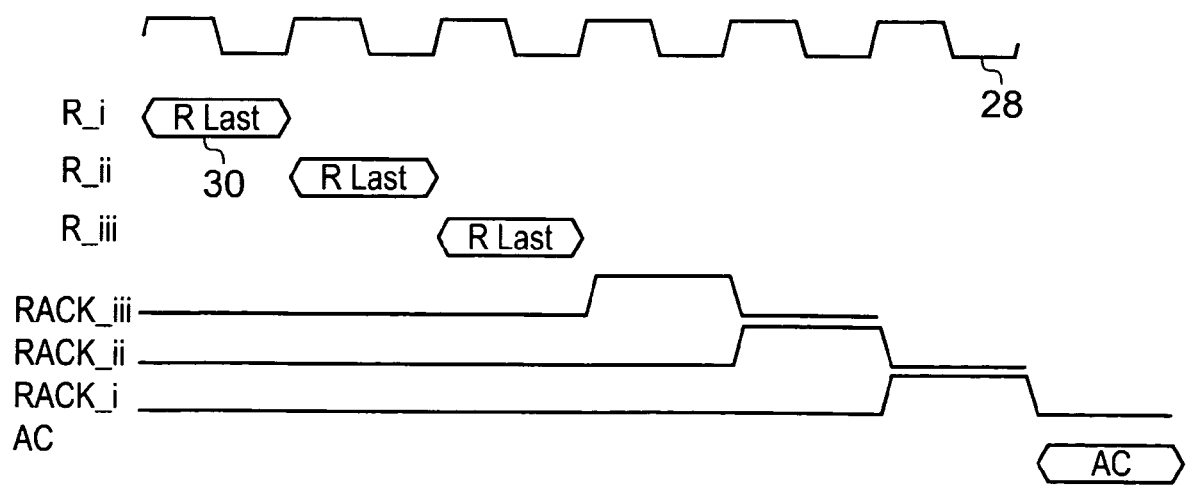
FIG. 5 is a signal diagram illustrating how the provision of the complete acknowledgement signal modifies the behaviour illustrated in FIG. 3.

FIG. 5 is a signal diagram illustrating the behaviour of the circuit arrangement of FIG. 4. The clock signal 28 and the transfer-complete signal R Last 30 are transferred in the same fashion as FIG. 3. However, the transaction master 20 does not generate the complete-acknowledgement signal RACK until the clock cycle following receipt of the transfer-complete signal R Last 30 at the transaction master 20. This complete-acknowledgement signal RACK then propagates back through the register stages 24, 26 of the read data channel to the transaction slave 22. It will be appreciated that the complete-acknowledge signal RACK does not have to propagate through the same register slices or the same number of register slices as the read transfer, e.g. RACK could go through two slices and R through three slices or vice-versa. The transaction slave 22 defers sending the snoop request AC to the transaction master 20 until after the complete-acknowledgement signal RACK is received at the transaction slave 22. It should be noted that there may be multiple complete-acknowledgement signals RACK outstanding at a given time.

The example illustrated in FIGS. 4 and 5 is a read transaction for which the transfer-complete signal R Last 30 is a signal indicating that the last data word of the read transaction is or will be transmitted. This last word signal is sent for all read transactions sent for read transactions with an associated coherency requirement (e.g. a read where coherency management is requested for the data once it has been read). In the case of a write transaction from the transaction master 20 to the transaction slave 22, the transfer-complete signal returned from the transaction slave 22 may be the write acknowledgement signal (this is the B signal in accordance with the AMBA specification). This write acknowledgement signal is passed for all write transactions. The last word signal and the write acknowledge signal can be passed using a single signal line which is either asserted or not asserted so as to pass one bit of data indicating the required information.

Figure 6:
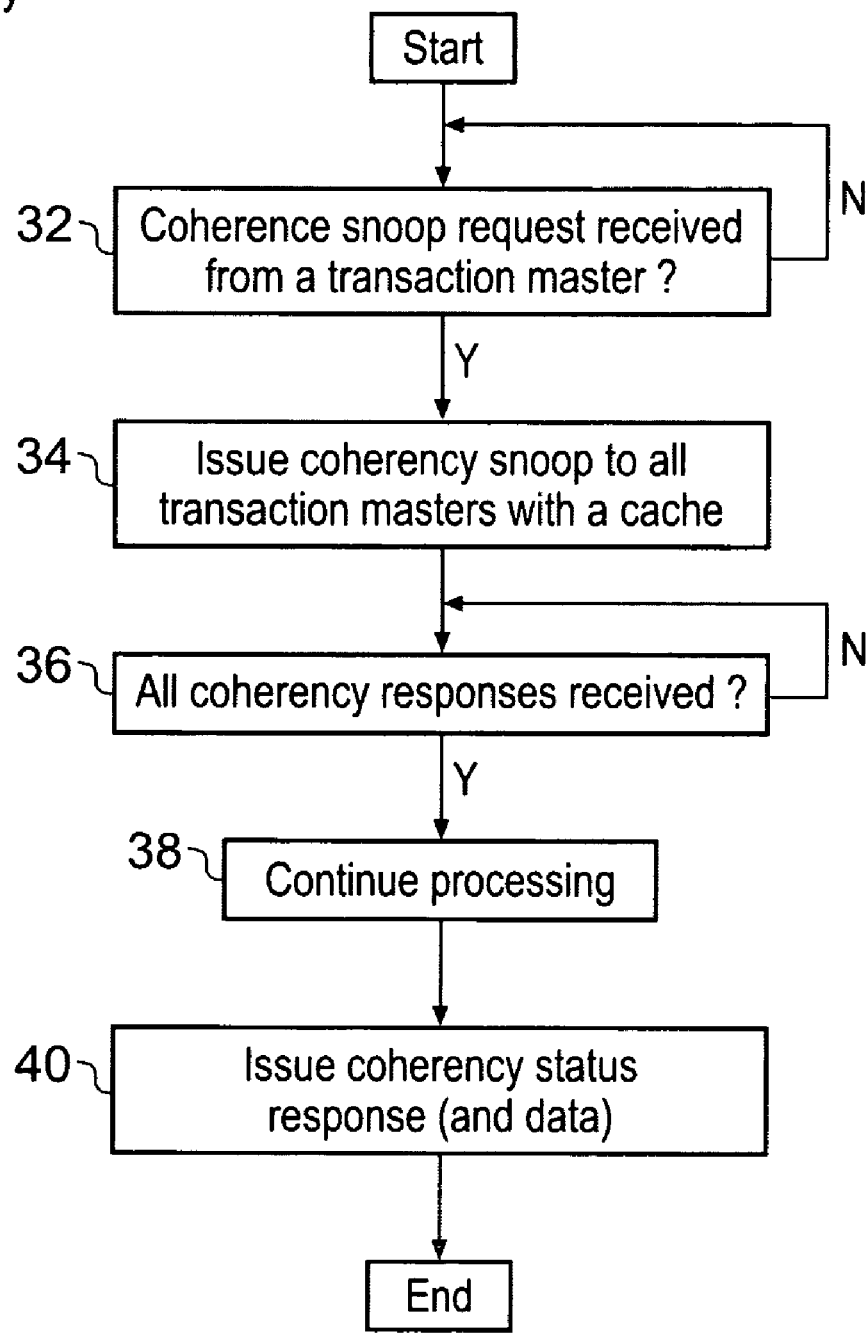
FIG. 6 is a flow diagram schematically illustrating the operations performed by coherence control circuitry provided within the interconnect circuitry.

FIG. 6 is a flow diagram schematically illustrating some of the operations performed by the coherence control circuitry 18 of FIG. 1. At step 32 processing waits until a coherency snoop request is received from a transaction master 4, 6, 8. Such a snoop request may be initiated as the result of a transaction master 4, for example, writing data values to a transaction slave 12 and wishing to determine whether any copies of those data values are held within the local caches of other transaction masters 6, 8. When such a snoop request is received, processing proceeds to step 34 at which the coherency control circuitry 18 issues snoop requests AC to all of the transaction masters which include a local cache memory. In accordance with the present technique, in some example embodiments, the issuing of these snoop requests are deferred until any pending transactions (read or write) to the relevant transaction master with an at least partially overlapping memory address range have been acknowledged as complete by the complete-acknowledgement signal being received at the transaction slave 14 connected to the coherence control circuitry 18.

At step 36 processing waits until all the coherency responses have been received from the transaction masters 6, 8 to which they were sent. These coherency responses may be delayed while a transaction master 6, 8 to which the snoop request was sent performs operations necessary to preserve coherence, e.g. marking their local copy of some data as invalid if that data is being written by another master. Once all the coherency responses (snoop responses) have been received, then processing proceeds to step 38 at which the candidate transaction is allowed to continue and the coherence status response (snoop response) is returned to the transaction master 4 (together with the associated data in the case of a read) at step 40.

Figure 7:
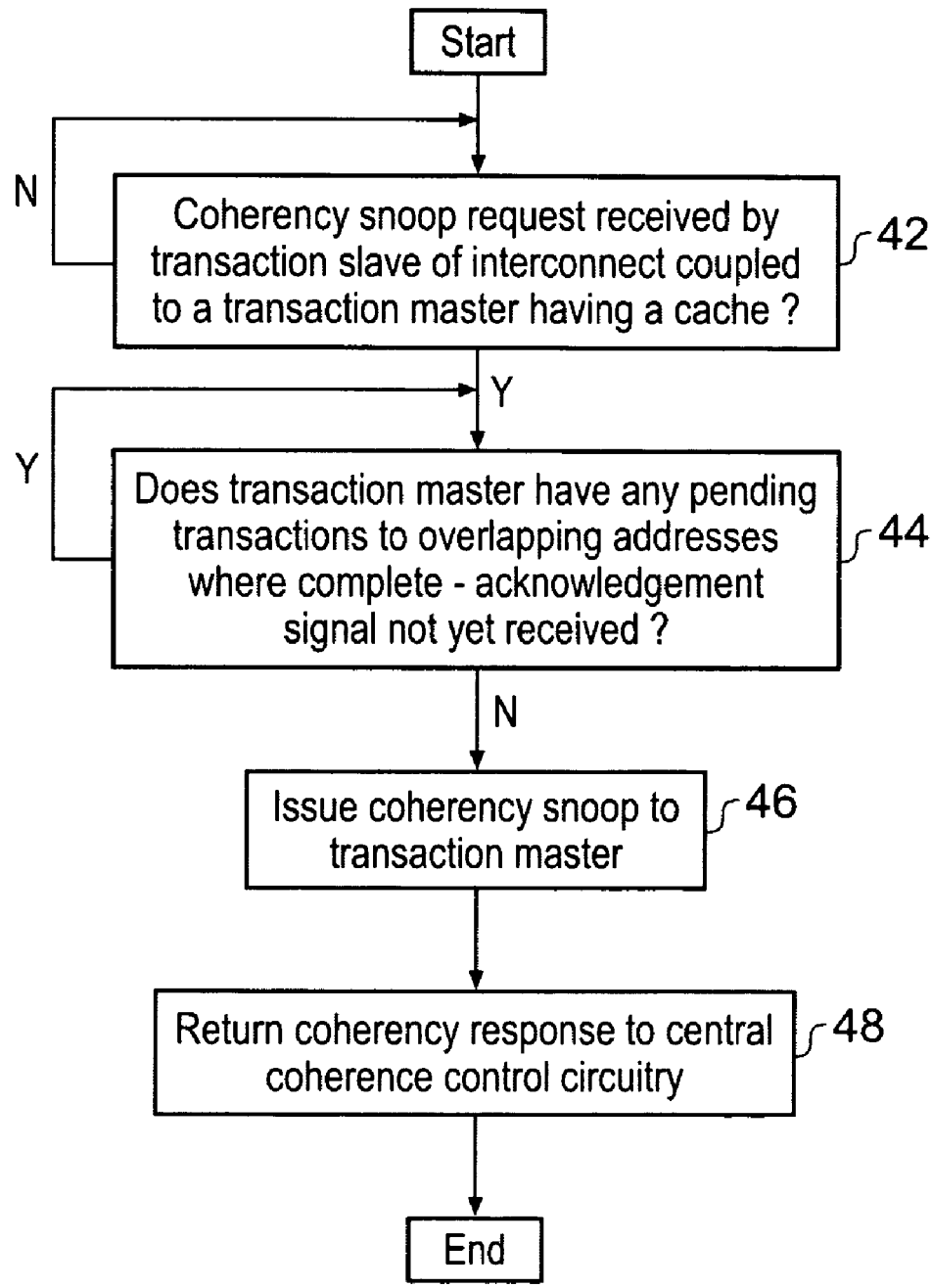
FIG. 7 is a flow diagram schematically illustrating how a transaction slave within interconnect circuitry communicating with a transaction master including a local cache memory responds to a snoop request.

FIG. 7 is a flow diagram schematically illustrating the processing performed by transaction slaves 14 coupled to transaction masters 4, 6, 8 which contain local cache memories when a snoop request is received from the coherence control circuitry 18. Processing waits at step 42 until a snoop request is received by the transaction slave 14. At step 44 the transaction slave 14 determines whether there are any pending transactions to at least partially overlapping memory addresses currently in progress with respect of their connected transaction master 4, 6, 8 and for which a complete-acknowledgement signal has not yet been received. If here are such pending transactions, then processing waits at step 44. Step 44 provides an alternative way of providing the functionality previously described in relation to step 34, namely deferring the issue by the coherence control circuitry 18 of snoop requests to transaction masters 4, 6, 8 having address overlapping pending transactions. If the processing of the flow diagram of FIG. 7 is used, then step 34 in FIG. 6 can issue the snoop requests to the transaction slaves 14 within the interconnect circuitry 10 without any delay and leave it to these transaction slaves 14 to defer forwarding those snoop requests to their respective transaction masters 4, 6, 8 until any potentially conflicting pending transactions have been acknowledged as complete.

Once the determination at step 44 has identified that there are no potentially conflicting pending transactions with the connected transaction master 4, 6, 8, processing proceeds to step 46 at which the snoop request AC is issued to the transaction master 4, 6, 8. At step 48 the snoop response CR received from the transaction master 4, 6, 8 by the transaction slave 14 within the interconnect circuitry 10 is returned to the coherency control circuitry 18 and is forwarded on to the transaction master 4, 6, 8 which initiated the transaction request in respect of which the snoop operation is being performed.

Figures 8, 9:
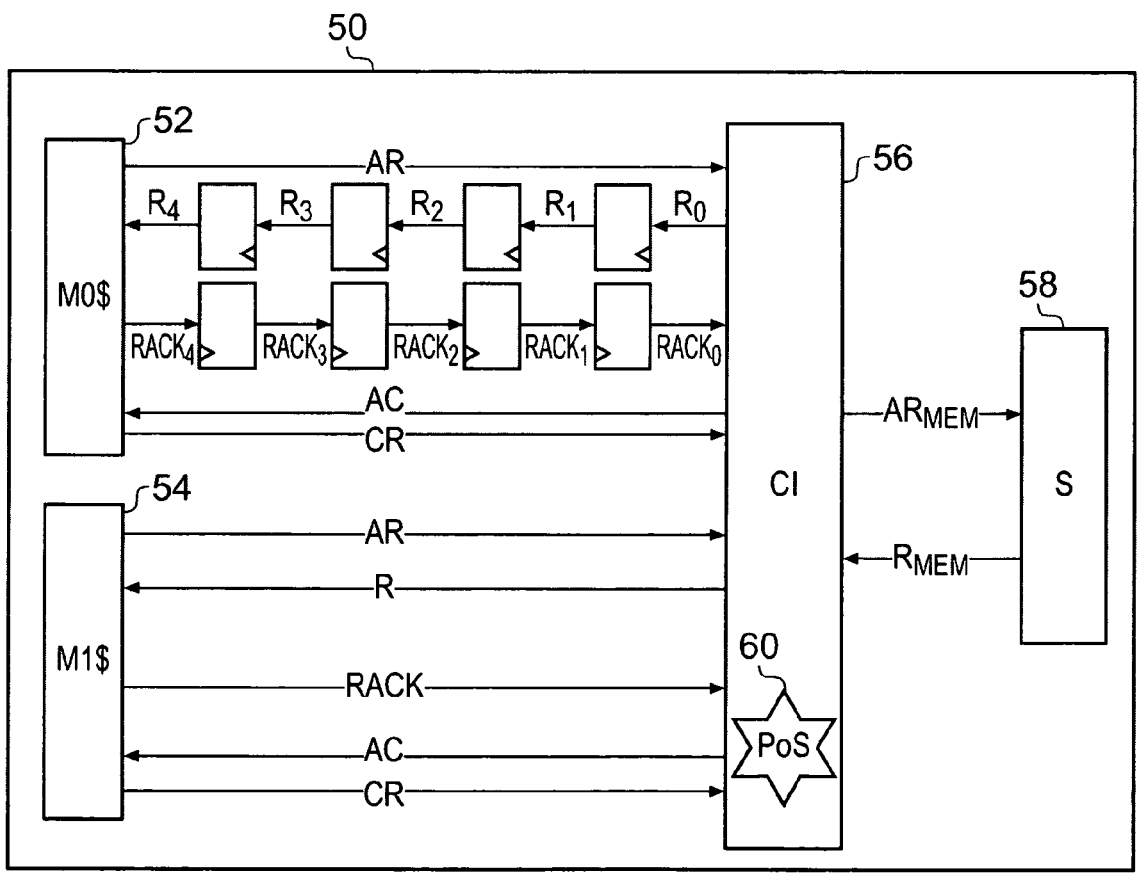
FIG. 8 illustrates how a complete-acknowledgement signal may be generated for a read transaction and for a write transaction using a logical combination of existing interconnect signals.
FIG. 9 schematically illustrates an integrated circuit in which a breakdown of coherence control can occur during a read request.

FIG. 8 gives logical expressions which can be used to generate complete-acknowledgement signals for a read transaction (the complete-acknowledgement signal being RACK) and write transactions (the complete-acknowledgement signal being WACK). In both of these cases, a simple logical AND of existing signals within the AMBA specification can be used to generate the complete-acknowledgement signals. Reference can be made to the published AMBA specification (the content of which is incorporated herein in its entirety by reference) for further details of these particular signals. In the case of a read transaction, these signals indicate the validity of read data, the acceptance of read data and whether the read data comprises the last word of read data. In the case of a write transaction, these signals correspond to the validity of the write response data together with the ready status of the write response data.

It may be that certain transaction masters are not sensitive to coherence control issues. In these cases the complete-acknowledgement signals for both read and write transactions, RACK and WACK, can be tied high (asserted) so that the same form of transaction slave 14, 22 can be used to respond to those complete-acknowledgement signals as for transaction masters which are coherence sensitive. The transaction slave 14, 22 is configured to start sampling the complete-acknowledgement signal once it has sent the associated transfer-complete signal (either a last word signal or a write acknowledgement signal).

Figure 10:
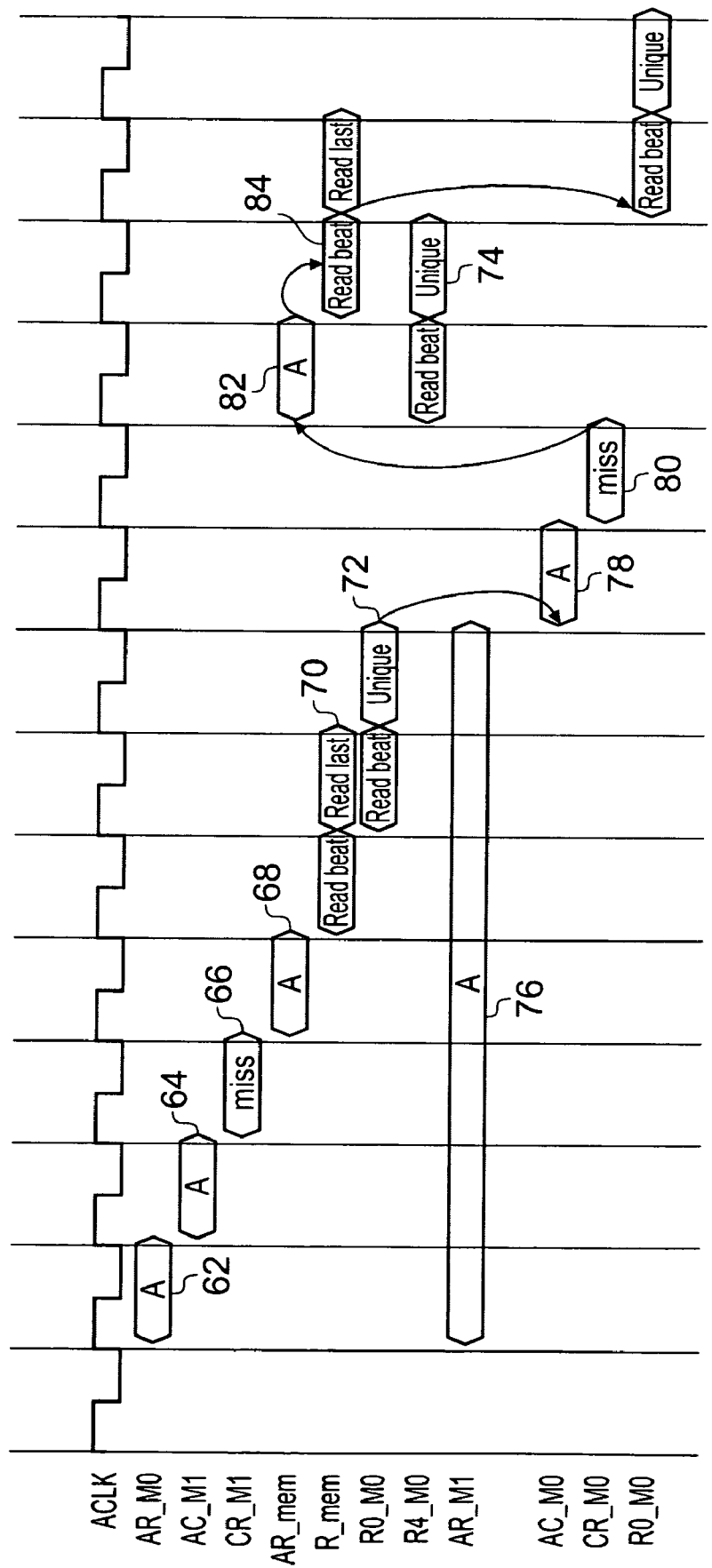
FIG. 10 is a signal diagram illustrating in more detail how a breakdown in coherence control can arise in the system of FIG. 9.
Figure 11:
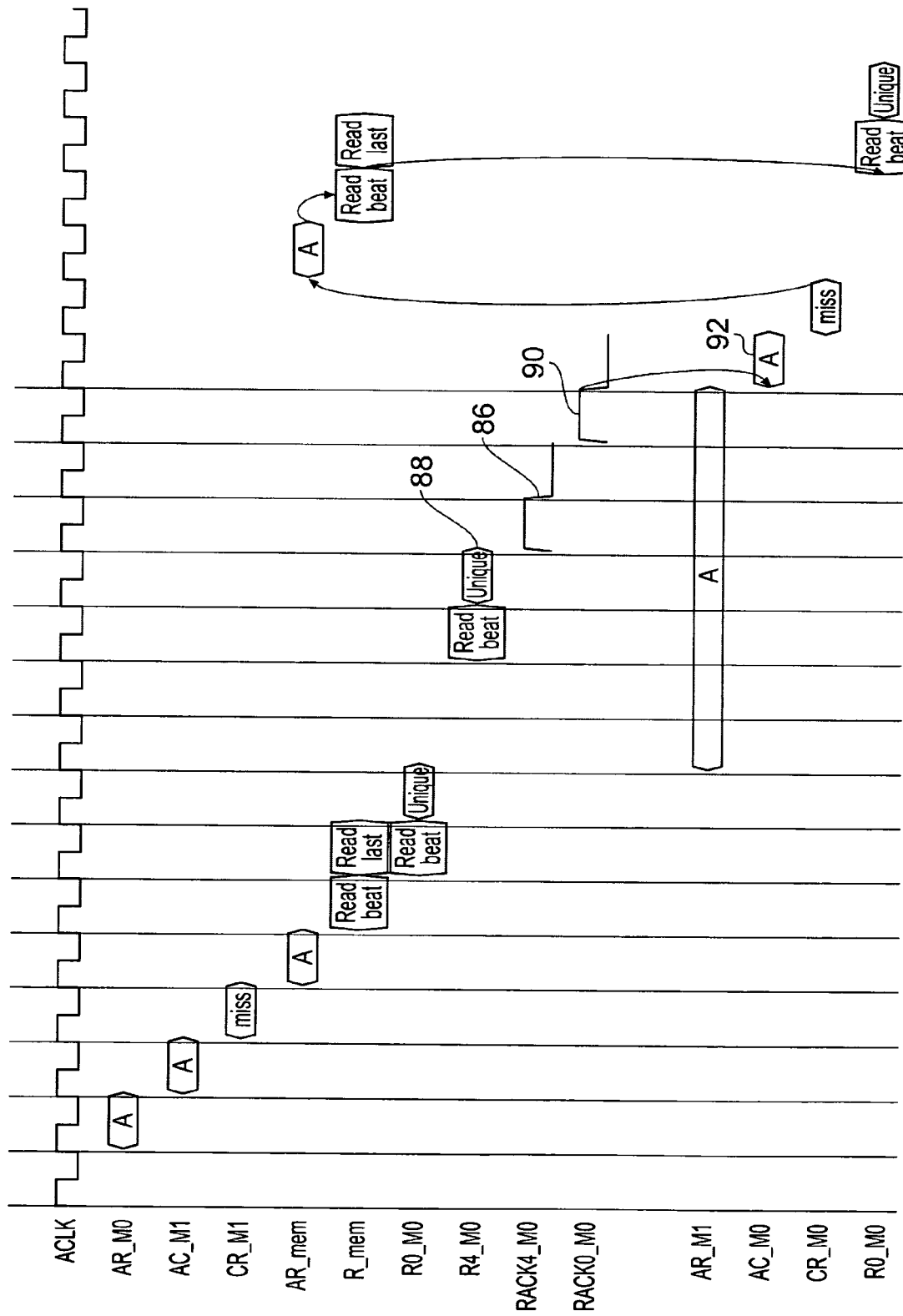
FIG. 11 is a signal diagram illustrating how the provision of a complete acknowledgement signal to acknowledge completion of a read transaction can overcome the problem illustrated in FIG. 10.

FIGS. 9, 10 and 11 illustrate another integrated circuit 50 including transaction masters 52, 54 connected via interconnect circuitry 56 to a transaction slave 58. The interconnect circuitry 56 is coherent interconnect circuitry including coherence control circuitry 60 (a point of serialisation). As illustrated, the read data channel R to the transaction master 52 contains four register stages whereas the snoop (coherency) channels AC/CR to this transaction master 52 contains no register stages. Accordingly, a snoop request from the coherence control circuitry 60 to the transaction master 52 can overtake a read transaction passing between the register stages and result in an incorrect snoop response. FIG. 10 illustrates this behaviour.

Signal 62 is a read request asserted by the transaction master 52 to initiate a read transaction. This results in a snoop request 64 being sent to the transaction master 54. The transaction master 54 does not contain any conflicting data and accordingly the snoop response 66 is a miss. The coherency control circuitry 60 then passes the read transaction onto the transaction slave 58 by issuing a read request as signal 68. The read data is then returned as read data 70 to the interconnect circuitry 56. This read data propagates through the four register stages of the read data channel to the transaction master 52 as illustrated by the signals 72, 74. In this example, problem situation, before the read data has been received as signal 74 at the transaction master 52, the transaction master 54 seeks to initiate a read of overlapping data from the transaction slave 58. It does this by issuing a read request signal 76, which in turn generates a snoop request passed to the transaction master 52 as signal 78. Since the read data 74 has not yet reached the transaction master 52 (this read data being marked as unique and clean in terms of its coherence status), the transaction master 52 will return a miss as its snoop response in signal 80. The transaction slave 58 will then start to process the read transaction from the transaction slave 54 first by receipt of the read request signal 82 and then the return of the overlapping read data signal 84.

It will be appreciated that since the snoop request 78 and the snoop response 80 for the transaction master 52 overtook the read transaction within the register stages of the read data channel, an incorrect snoop response was returned and a breakdown in coherence can result. In this example, both the transaction master 52 and the transaction master 54 can read data marked as unique and clean whereas only one of these transaction masters should be allowed to hold the data in this form.

FIG. 11 shows how the behaviour of the integrated circuit 50 in FIG. 9 can be modified by the use of the complete-acknowledgement signal RACK associated with the read transaction. In FIG. 10 the integrated circuit 50 of FIG. 9 was considered as if the complete-acknowledgement signal RACK was not present and the associated control circuitry within a coherence control circuitry 60 and transaction slaves 14 within the interconnect circuitry 56 were not present. In FIG. 11 this complete-acknowledgement signal is used. As illustrated, the complete-acknowledgement signal 86 is not generated by the transaction master 52 until after the transfer-complete signal 88 has been received at the transaction master 52. This transfer-complete signal is a last word signal R LAST. Once the complete-acknowledgement signal is generated, it propagates back through the read data channel (which may or may not be via the same register stages) until it is received at the interconnect circuitry as signal 90. The coherence control circuitry 60, or the transaction slave 14 connected to the transaction master 54 within the interconnect circuitry 56, defers the snoop request signal 92 being sent to the transaction master 52 as a consequence of the read transaction being sought by the transaction master 54. This deferring of the snoop request 92 until after the complete-acknowledgement signal 90 is received at the transaction slave 14 (and coherence control circuitry 60) has the result that the correct response will subsequently be returned from the transaction master 52 taking account of the read transaction which has now properly completed within the transaction master 52.

Figure 12:
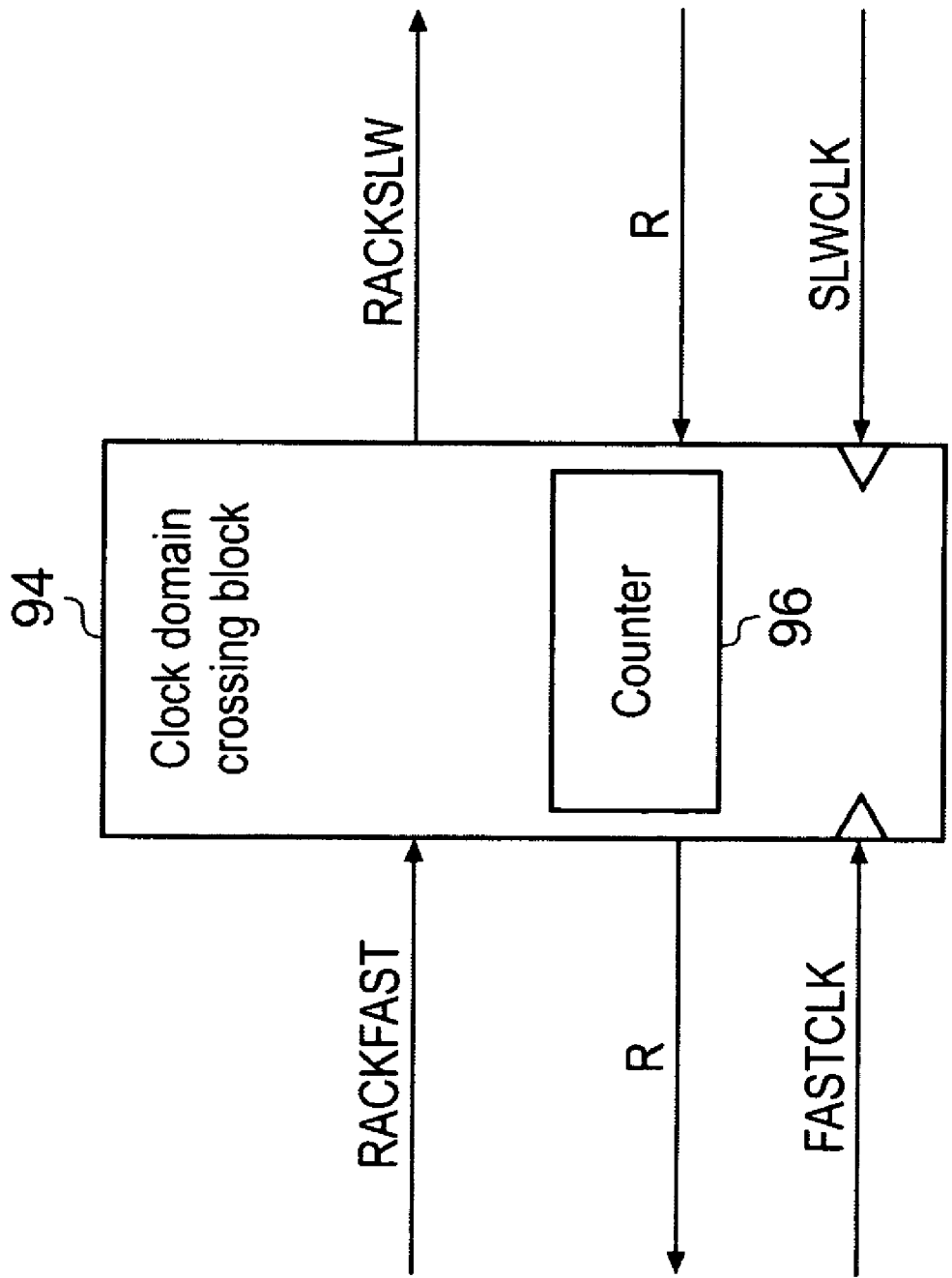
FIG. 12 illustrates a clock domain crossing circuit provided within an integrated circuit for passing a complete-acknowledgement signal between clock domains operating at different frequencies.
Figure 13:
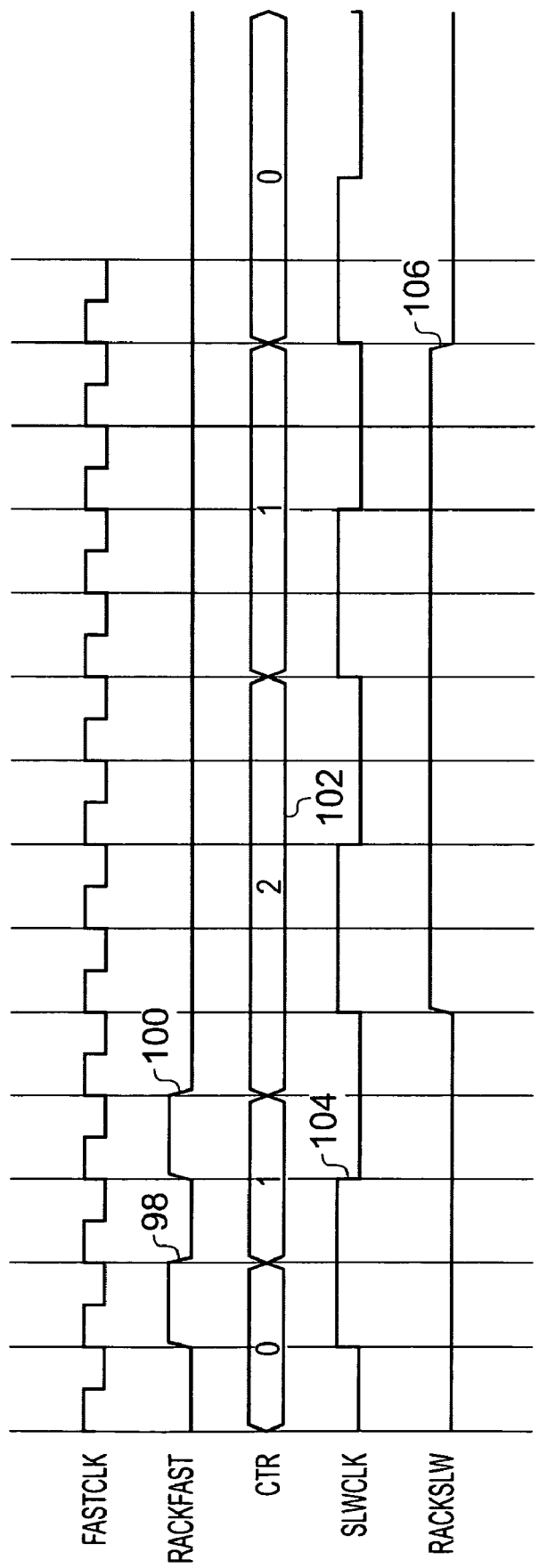
FIG. 13 is a signal diagram illustrating the operation of the clock domain crossing circuitry of FIG. 12.

FIG. 12 illustrates clock domain crossing circuitry 94 for use in passing a complete-acknowledgement signal (RACK-FAST) from a fast clock domain to a slow clock domain. The fast clock domain can assert the complete-acknowledgement signal multiple times before the slow clock domain is able to read those signals. A counter 96 counts received complete-acknowledgement signals which have not yet been read by the slow domain. This behaviour is illustrated in FIG. 13. Two complete-acknowledgement signals 98, 100 are received and counted by the counter 96 as illustrated by count value 102. The slow clock signal 104 controlling the slow clock domain then results in these complete-acknowledgement signals being read out (as RACKSLOW) in the slow domain and the count value decremented. As shown, the complete-acknowledgement signal is properly asserted for two clock cycles 106 of the slow clock such that the count value is decremented down to zero.

Figure 14:
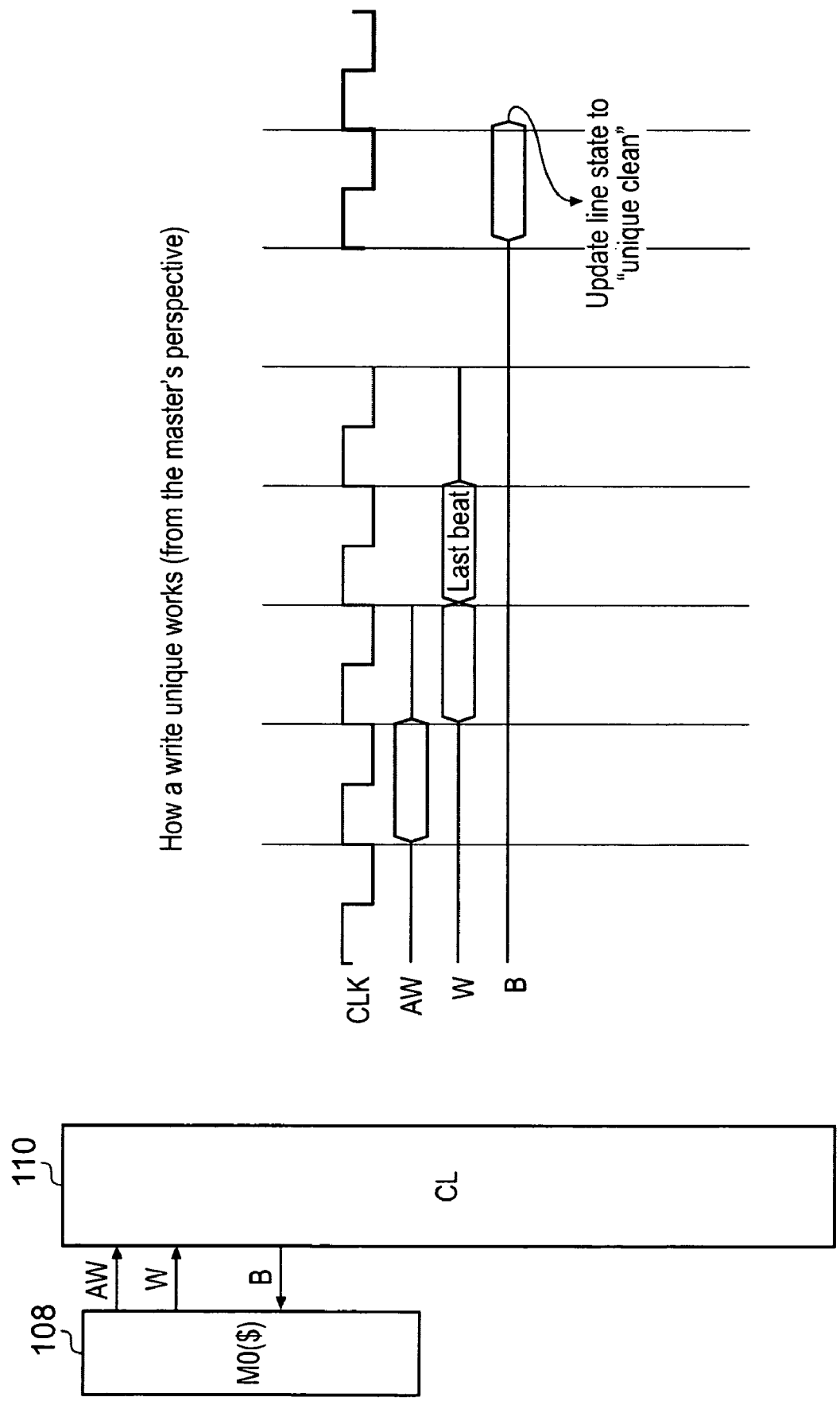
FIG. 14 is a diagram illustrating how a write transaction may be performed between a transaction master and the transaction slave within a coherent interconnect for a "write unique" data transfer.
Figure 15:
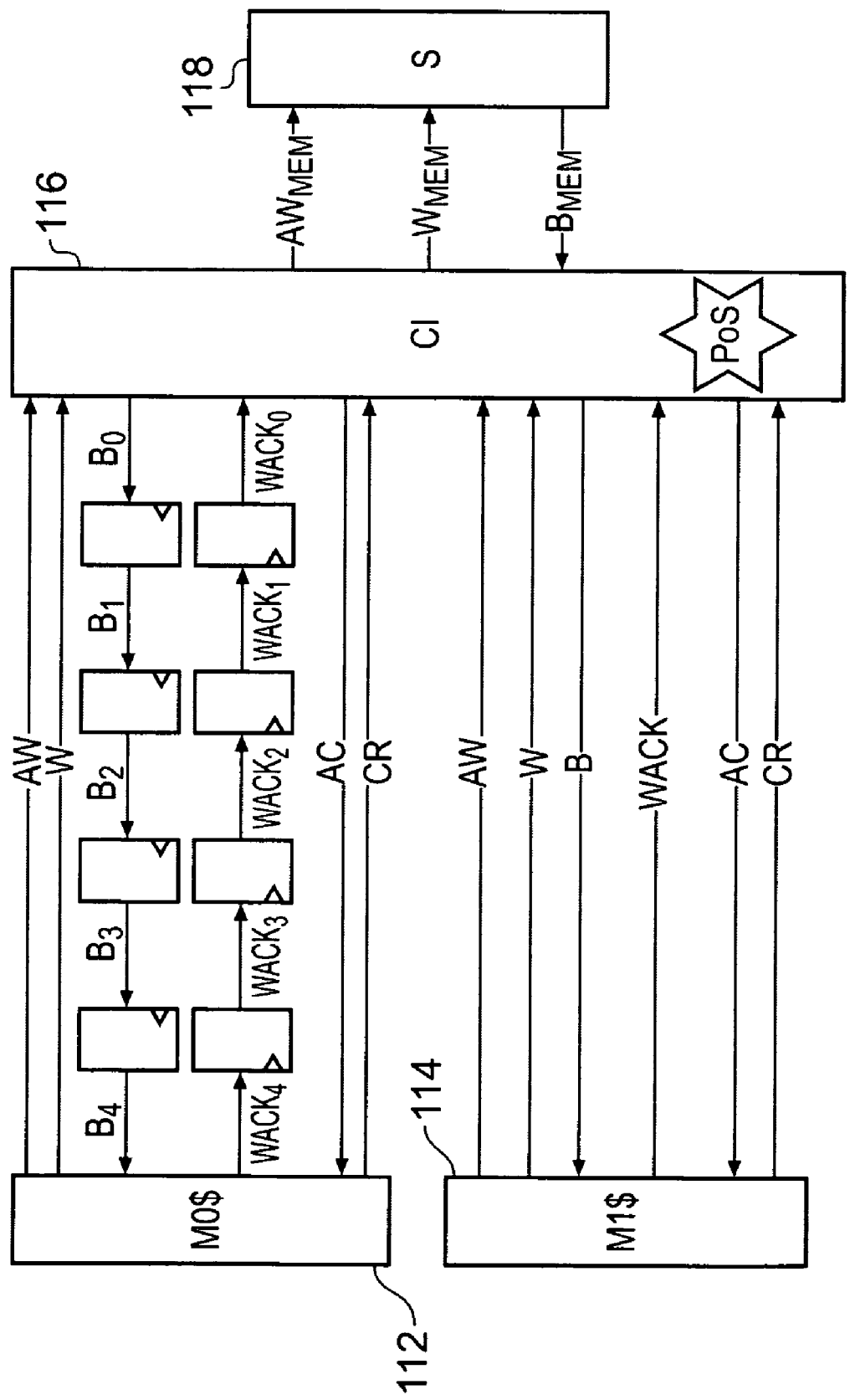
FIG. 15 illustrates an integrated circuit in which a coherency breakdown can occur as a consequence of a write transaction.
Figure 16:
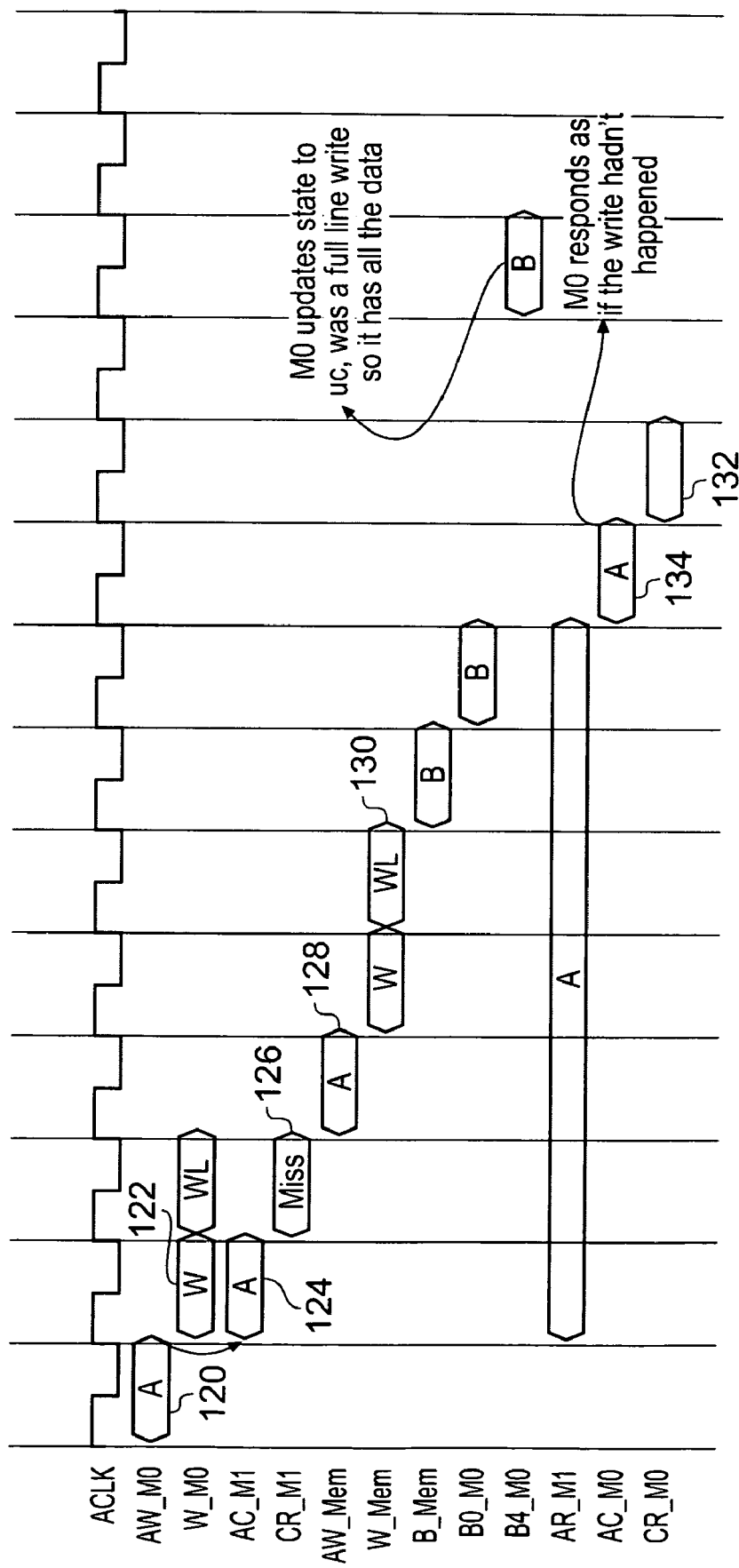
FIG. 16 is a signal diagram illustrating how the coherency breakdown can arise during a write transaction.

FIGS. 14, 15 and 16 illustrate a coherence breakdown which can occur in connection with a write transaction and which is addressed by a complete-acknowledgement signal (WACK) of the present technique. As illustrated in FIG. 14 a transaction master 108 communicates with interconnect circuitry 110 to issue a write request AW and write data W. A write response signal B (transfer-complete signal) is subsequently returned. The write response signal B is used by the transaction master 108 to update its coherency status data associated with the locally stored copy of the written data to indicate this data as "unique clean" data. This coherency status data will be used to generate snoop responses to snoop requests received in connection with transactions being performed by other transaction masters.

FIG. 15 illustrates two transaction masters 112, 114 connected via interconnect circuitry 116 to a transaction slave 118. The write response channel B includes two register stages. This has the result that a snoop request to the transaction master 112 can overtake a write response B. This write response B is used to update the coherency status within the transaction master 112 (as referred to above) to "unique clean" and accordingly an incorrect snoop response may be issued if the snoop request overtakes the write acknowledgement.

FIG. 16 illustrates this circumstance. The transaction master 112 issues a write request signal 120 followed by write data 122. The resulting snoop request 124 to the other transaction master 114 results in a snoop response in the form of a miss 126 indicating that the write transaction can proceed. Accordingly, a write request 128 and write data 130 are passed to the transaction slave 118. The write response B from the transaction slave 118 is returned to the transaction master 112 which initiated the write transaction, but this takes multiple clock cycles as a consequence of the various register stages in the signal path. However, once the write response B has passed through the interconnect circuitry 116 and has been seen by the coherence control circuitry therein, the coherence control circuitry will consider the write transaction as completed even though the write response has not reached the transaction master 112. Accordingly, another data transfer transaction, such as a read transaction, from the transaction master 14 will now be allowed to proceed as it will be considered by the coherence control circuitry to be properly serialised. However, the resulting snoop request to the transaction master 114 will overtake the write response signal B for the preceding write transaction and accordingly the transaction master 112 can return an incorrect snoop response 132.

The incorrect behaviour in FIG. 16 may be modified by the provision of a complete-acknowledgement signal (WACK-write acknowledge) passed from the transaction master 112 to the transaction slave 114 within the interconnect circuitry 116 and the modification of the coherence control circuitry such that the snoop request 134 is not issued to the transaction master 112 until after this complete-acknowledgement signal WACK has been received (indicating that the write response B has been received by the transaction master 112).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit comprising:
a transaction master;
a transaction slave coupled to said transaction master so as to receive a transaction request generated by said transaction master for a data transfer operation to be performed and to supply a transaction response to said transaction master, wherein said transaction master is responsive to a transfer-complete signal within said transaction response indicating completion of said data transfer operation to supply a complete-acknowledgement signal to said transaction slave so as to acknowledge receipt of said transfer-complete signal; and
at least one register stage is disposed in at least one signal path between said transaction master and said transaction slave.

2. An integrated circuit as claimed in claim 1, wherein said data transfer operation is a read transaction and said transaction response includes one or more data words supplied to said transaction master.

3. An integrated circuit as claimed in claim 1, wherein said data transfer operation is a write transaction in which one or more data words are written by said transaction master.

4. An integrated circuit as claimed in claim 3, wherein said transfer-complete signal is a write acknowledge signal for said one or more data words for all write transactions.

5. An integrated circuit as claimed in claim 1, wherein said complete-acknowledgement signal is one of:
supplied in respect of all data transfer operations; and
supplied only in respect of data transfer operations having an associated coherency requirement.

6. An integrated circuit as claimed in claim 1, wherein, if said transaction request is a read request, then said complete-acknowledgement signal is a single read acknowledgement signal.

7. An integrated circuit as claimed in claim 1, wherein, if said transaction request is a write request, then said complete-acknowledgement signals is a single write acknowledgement signal.

8. An integrated circuit comprising:
a transaction master; and
a transaction slave coupled to said transaction master so as to receive a transaction request generated by said transaction master for a data transfer operation to be performed and to supply a transaction response to said transaction master, wherein said transaction master is responsive to a transfer-complete signal within said transaction response indicating completion of said data transfer operation to supply a complete-acknowledgement signal to said transaction slave so as to acknowledge receipt of said transfer-complete signal, wherein said data transfer operation is a read transaction and said transaction response includes one or more data words supplied to said transaction master, said transaction response includes data indicative of a coherency status of said one or more data words.

9. An integrated circuit comprising:
a transaction master; and
a transaction slave coupled to said transaction master so as to receive a transaction request generated by said transaction master for a data transfer operation to be performed and to supply a transaction response to said transaction master, wherein said transaction master is responsive to a transfer-complete signal within said transaction response indicating completion of said data transfer operation to supply a complete-acknowledgement signal to said transaction slave so as to acknowledge receipt of said transfer-complete signal, wherein said data transfer operation is a read transaction and
said transaction response includes one or more data words supplied to said transaction master, said transfer-complete signal is a last word signal indicating a last data word of said one or more data words for all read transactions.

10. An integrated circuit comprising:
a transaction master;
a transaction slave coupled to said transaction master so as to receive a transaction request generated by said transaction master for a data transfer operation to be performed and to supply a transaction response to said transaction master, wherein said transaction master is responsive to a transfer-complete signal within said transaction response indicating completion of said data transfer operation to supply a complete-acknowledgement signal to said transaction slave so as to acknowledge receipt of said transfer-complete signal; and
interconnect circuitry, said transaction master comprises a plurality of transaction masters coupled to said interconnect circuitry via respective one or more transaction slaves forming part of said interconnect circuitry.

11. An integrated circuit as claimed in claim 10 wherein said transaction slave comprises one or more transaction slaves, wherein said interconnect circuitry is coupled to said one or more transaction slaves via respective one or more transaction masters forming part of said interconnect circuitry.

12. An integrated circuit as claimed in claim 10, wherein said interconnect circuitry serves to route said data transfer operations.

13. An integrated circuit as claimed in claim 10, wherein at least one of said plurality of transactions masters includes a local cache memory and said interconnect circuitry includes coherency control circuitry generating a snoop transaction sent to said at least one of said plurality of transaction masters to identify any potential coherency conflict between data within said local cache memory and a candidate transaction request received from another transaction master.

14. An integrated circuit as claimed in claim 13, wherein said snoop transaction comprises a snoop request and a snoop response sent over separate independent channels.

15. An integrated circuit as claimed in claim 13, wherein said coherency control circuitry defers sending said snoop transaction to a transaction master in respect of a candidate transaction request accessing at least one memory address also accessed by a pending transaction request that has been generated by said transaction master until after said complete-acknowledgement signal of said pending transaction request has been received by said coherency control circuitry.

16. An integrated circuit as claimed in claim 13, wherein said coherency control circuitry defers sending said snoop transaction in respect of a candidate transaction of a first transaction master to a second transaction master having a pending transaction request until after said complete-acknowledgement signal of said pending transaction request has been received from said second transaction master by said coherency control circuitry.

17. An integrated circuit as claimed in claim 13, wherein said coherency control circuitry controls serialization of transaction requests received from different transaction masters.

18. An integrated circuit as claimed claim 13, comprising a plurality of different types of transaction master with a local cache memory as part of a heterogeneous coherent memory.

19. An integrated circuit as claimed in claim 10, wherein at least one of said transaction masters continuously asserts said complete-acknowledgement signal and a respective transaction slave starts sampling said complete-acknowledgement signal when said transaction response has been sent.

20. An integrated circuit comprising:
a transaction master; and
a transaction slave coupled to said transaction master so as to receive a transaction request generated by said transaction master for a data transfer operation to be performed and to supply a transaction response to said transaction master, wherein said transaction master is responsive to a transfer-complete signal within said transaction response indicating completion of said data transfer operation to supply a complete-acknowledgement signal to said transaction slave so as to acknowledge receipt of said transfer-complete signal, wherein said transaction master is configured to transmit complete-acknowledgement signals at a faster rate than said transaction slave can receive said complete-acknowledgement signals and comprising a counter circuit between said transaction master and said transaction slave configured to count complete-acknowledgement signals generated by said transaction master and to assert a complete-acknowledgement signal to said transaction slave to permit a corresponding number of complete-acknowledgement signals to be received by said transaction slave.

21. An integrated circuit comprising:
interconnect circuitry including a plurality of transaction slaves; and
a plurality of transaction masters including at least one transaction master having a local cache memory and coupled to said interconnect circuitry via at least one transaction slave of said plurality of transaction slaves, wherein said at least one transaction slave is coupled to said at least one transaction master so as to receive a transaction request generated by said at least one transaction master for a data transfer operation to be performed and to supply a transaction response to said at least one transaction master;
said at least one transaction master is responsive to a transfer-complete signal within said transaction response indicating completion of said data transfer operation to supply an complete-acknowledgement signal to said at least one transaction slave so as to acknowledge receipt of said transfer-complete signal;
said interconnect circuitry includes coherency control circuitry generating a snoop transaction sent to said at least one transaction master to identify any potential coherency conflict between data within said local cache memory and a candidate transaction request received from another transaction master of said plurality of transaction masters; and
said coherency control circuitry defers sending said snoop transaction to said at least one transaction master in respect of a candidate transaction request accessing at least one memory address also accessed by a pending transaction requests that has been generated by said at least one transaction master until after said complete-acknowledgement signal of said pending transaction request has been received by said coherency control circuitry.

22. An integrated circuit comprising:
interconnect circuitry including a plurality of transaction slaves; and
a plurality of transaction masters including at least one transaction master having a local cache memory and coupled to said interconnect circuitry via at least one transaction slave of said plurality of transaction slaves, wherein said at least one transaction slave is coupled to said at least one transaction master so as to receive a transaction request generated by said at least one transaction master for a data transfer operation to be performed and to supply a transaction response to said at least one transaction master;
said at least one transaction master is responsive to a transfer-complete signal within said transaction response indicating completion of said data transfer operation to supply an complete-acknowledgement signal to said at least one transaction slave so as to acknowledge receipt of said transfer-complete signal;
said interconnect circuitry includes coherency control circuitry generating a snoop transaction sent to said at least one transaction master to identify any potential coherency conflict between data within said local cache memory and a candidate transaction request received from another transaction master of said plurality of transaction masters; and
said coherency control circuitry defers sending said snoop transaction in respect of a candidate transaction of said another transaction master to said at least one transaction master having a pending transaction request until after said complete-acknowledgement signal of said pending transaction request has been received from said at least one transaction master by said coherency control circuitry.

23. An integrated circuit comprising:
transaction master means for generating a transaction request;
transaction slave means, coupled to said transaction master means for receiving said transaction request generated by said transaction master means for a data transfer operation to be performed and for supplying a transaction response to said transaction master means, wherein said transaction master means is responsive to a transfer-complete signal within said transaction response indicating completion of said data transfer operation to supply an complete-acknowledgement signal to said transaction slave means so as to acknowledge receipt of said transfer-complete signal; and
at least one register stage is disposed in at least one signal path between said transaction master means and said transaction slave means.

24. A method of operating an integrated circuit comprising the steps of:
generating with a transaction master a transaction request for a data transfer operation to be performed;
receiving with a transaction slave said transaction request;
supplying a transaction response to said transaction master; wherein said transaction master is responsive to a transfer-complete signal within said transaction response indicating completion of said data transfer operation to supply an complete-acknowledgement signal to said transaction slave so as to acknowledge receipt of said transfer-complete signal; and
disposing at least one register stage in at least one signal path between said transaction master and said transaction slave.

25. A method of operating an integrated circuit having interconnect circuitry including a plurality of transaction slaves and a plurality of transaction masters including at least one transaction master having a local cache memory and coupled to said interconnect circuitry via at least one of said transaction slaves, said method comprising the steps of:
generating with a transaction master a transaction request for a data transfer operation to be performed;
receiving with said at least one transaction slave said transaction request; and
supplying a transaction response to said at least one transaction master; wherein
said at least one transaction slave is coupled to said at least one transaction master so as to receive a transaction request generated by said at least one transaction master for a data transfer operation to be performed and to supply a transaction response to said at least one transaction master;
said at least one transaction master is responsive to a transfer-complete signal within said transaction response indicating completion of said data transfer operation to supply an complete-acknowledgement signal to said at least one transaction slave so as to acknowledge receipt of said transfer-complete signal;
said interconnect circuitry includes coherency control circuitry generating a snoop transaction sent to said at least one transaction master to identify any potential coherency conflict between data within said local cache memory and a candidate transaction request received from another transaction master of said plurality of transaction masters; and
said coherency control circuitry defers sending said snoop transaction to said at least one transaction master in respect of a candidate transaction request accessing at least one memory address also accessed by a pending transaction request generated by said at least one transaction master until after said complete-acknowledgement signal of said pending transaction request has been received by said coherency control circuitry.

26. A method of operating an integrated circuit having interconnect circuitry including a plurality of transaction slaves and a plurality of transaction masters including at least one transaction master having a local cache memory and coupled to said interconnect circuitry via at least one of said transaction slaves, said method comprising the steps of:
generating with said at least one transaction master a transaction request for a data transfer operation to be performed;
receiving with said at least one transaction slave said transaction request; and
supplying a transaction response to said at least one transaction master; wherein
said at least one transaction slave is coupled to said at least one transaction master so as to receive a transaction request generated by said at least one transaction master for a data transfer operation to be performed and to supply a transaction response to said at least one transaction master;
said at least one transaction master is responsive to a transfer-complete signal within said transaction response indicating completion of said data transfer operation to supply an complete-acknowledgement signal to said at least one transaction slave so as to acknowledge receipt of said transfer-complete signal;

said interconnect circuitry includes coherency control circuitry generating a snoop transaction sent to said at least one transaction master to identify any potential coherency conflict between data within said local cache memory and a candidate transaction request received from another transaction master of said plurality of transaction masters; and said coherency control circuitry defers sending said snoop transaction in respect of a candidate transaction of said another transaction master to said at least one transaction master having a pending transaction request until after said complete-acknowledgement signal of said pending transaction request has been received from said at least one transaction master by said coherency control circuitry.

* * * * *